United States Patent [19]
Martin

[11] Patent Number: 5,181,809
[45] Date of Patent: Jan. 26, 1993

[54] BENCHMARK DEVICE FOR A PLANE FACE, AND A MACHINING SYSTEM IMPLEMENTING IT

[75] Inventor: Guy E. Martin, Colomiers, France

[73] Assignee: Aerospatiale Societe Nationale Industrielle, Paris, France

[21] Appl. No.: 782,316

[22] Filed: Oct. 24, 1991

[30] Foreign Application Priority Data

Oct. 24, 1990 [FR] France .................. 90 13181

[51] Int. Cl.$^5$ .................................. B23B 49/02
[52] U.S. Cl. .................................. 408/3; 33/503; 33/562; 408/13
[58] Field of Search .................. 408/2, 3, 13, 72 B; 33/502, 503, 562, 563, 638

[56] References Cited

U.S. PATENT DOCUMENTS

4,326,824  4/1982  Lasermann et al. .................. 408/13

FOREIGN PATENT DOCUMENTS

2210713  9/1973  Fed. Rep. of Germany .
2099433  3/1972  France .
2555091  5/1985  France .
  15604  1/1982  Japan .................................. 408/3

Primary Examiner—Daniel W. Howell
Attorney, Agent, or Firm—Fisher, Christen & Sabol

[57] ABSTRACT

A benchmark device for a plane face comprises at least three benchmark elements which together define a reference plane parallel to said plane face, together with a system of rectangular axes enabling any point of said plane face to be located.

11 Claims, 3 Drawing Sheets

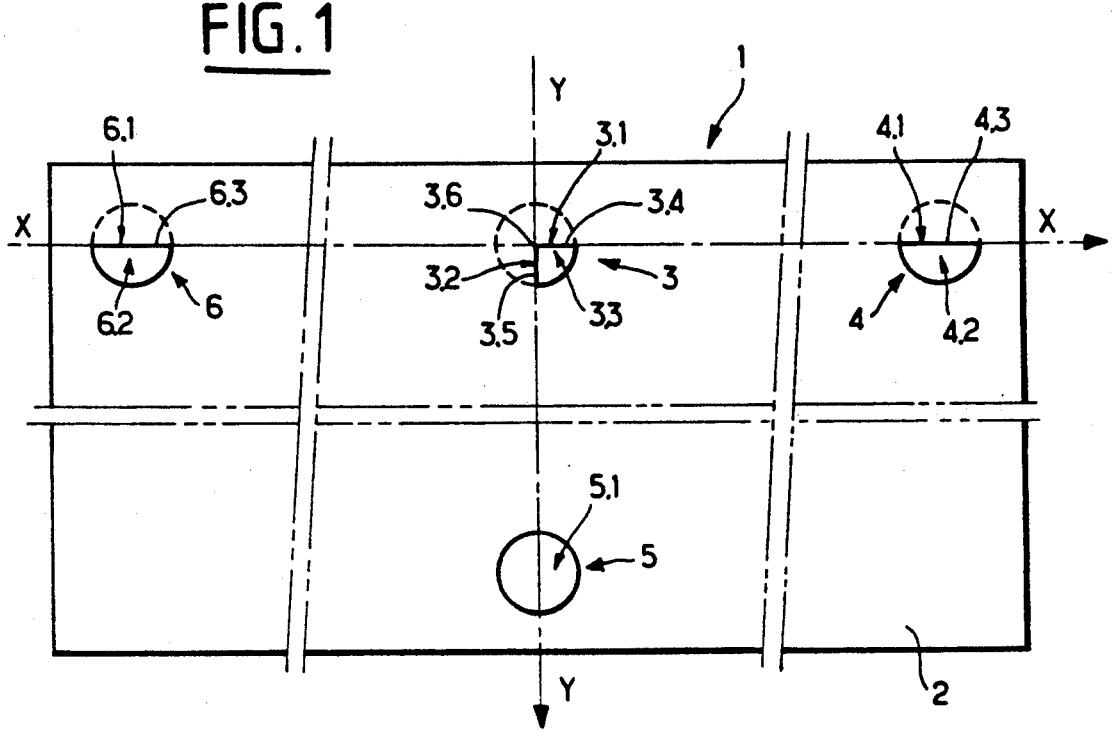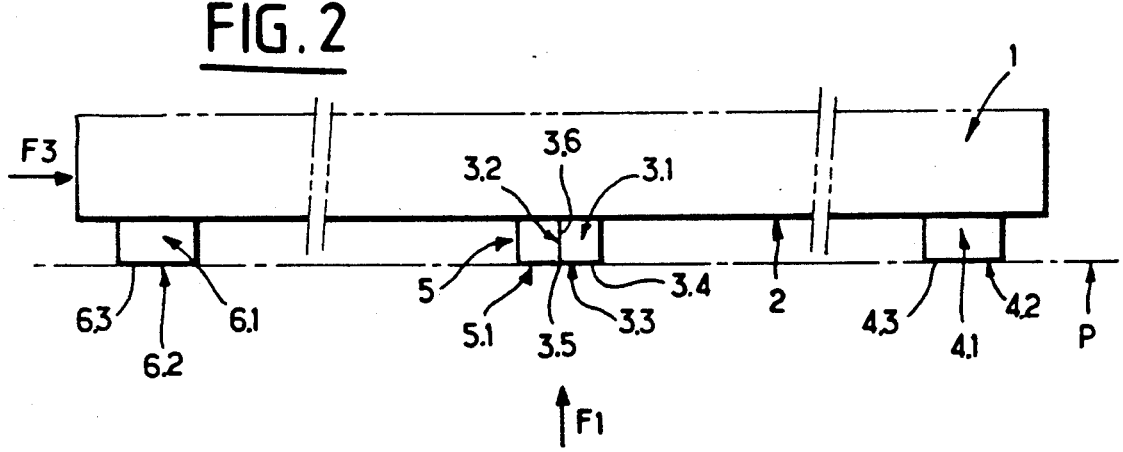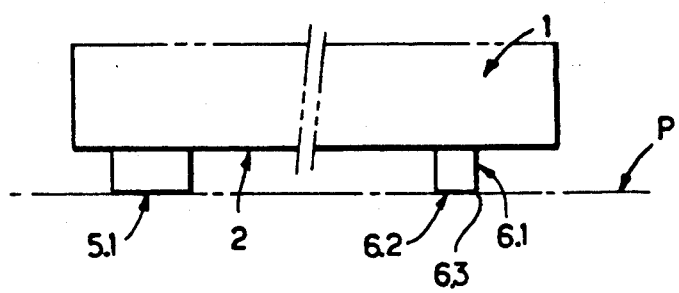

BENCHMARK DEVICE FOR A PLANE FACE, AND A MACHINING SYSTEM IMPLEMENTING IT

BACKGROUND OF THE INVENTION

The present invention relates to a benchmark device for a plane face, and also to a system for machining workpieces that implements the device. The plane face may be embodied physically or not. The invention makes it possible to locate any point of an object that is rigidly connected to said plane face.

SUMMARY OF THE INVENTION

According to the invention, the benchmark device for a plane face is remarkable:
in that it includes three benchmark elements which are carried by said plane face and which are such that:
the first benchmark element includes a rectangular trihedron with two facets that are orthogonal to said plane face and a third facet of said trihedron being parallel to said plane face such that one of the edges of said trihedron is perpendicular to said plane face and the other two edges of said trihedron are parallel to said plane face;
the second benchmark element includes a rectangular dihedron whose facets are respectively orthogonal and parallel to said plane face, such that the edge of said dihedron is parallel to said plane face, and
the third benchmark element includes a facet parallel to said plane face; and
in that said benchmark elements are disposed on said plane face in such a manner that:
they are not in alignment;
the facets of said three benchmark elements that are parallel to said plane face are coplanar; and
said edge of said second benchmark element is colinear with one of the two edges of said first benchmark element that are parallel to said plane face.

Thus, the plane defined by the facets of the three benchmark elements parallel to said plane face form a reference plane that may be used to determine the orientation of said plane face, while the edges of said first and second elements parallel to said plane face determine a system of two rectangular reference axes enabling the position of any point of said plane face to be located. The first of the axes of said reference system is formed by the colinear edges of said first and second elements, whereas the second of said axes is formed by the other edge of said first element that is parallel to said plane face. It may be observed that if said plane face is rigidly linked to an object, said benchmark elements also make it possible to locate the position of any point of said object.

It can be seen that said third benchmark element could, like the second element, include a rectangular dihedron, with its facets being respectively orthogonal and parallel to said plane face, such that the edge of said dihedron is parallel to said plane. Under such circumstances, the second axis of the reference system could be formed by the edge of said third element being in alignment with that one of the two edges of said first benchmark element running parallel to said plane face that is not in alignment with the edge of said second element. However, it often suffices for said second axis to be defined solely by the edge of said first element that is parallel to said plane face and is not in alignment with the edge of said second element. Under such circumstances, the third element does not include an edge, but merely a facet parallel to said plane face.

Whether or not the third benchmark element includes a dihedron as described above, it is advantageous for said third benchmark element to be disposed in such a manner that the alignment it forms with said first benchmark element is at least substantially perpendicular to the direction defined by the colinear edges of said first and second benchmark elements.

When the benchmark device of the invention is for use with a plane face that is elongate in the direction defined by said colinear edges of said first and second benchmark elements, it is advantageous for reasons of accuracy in determining said first reference axis for the device to include a fourth benchmark element including a rectangular dihedron, with the facets thereof being respectively orthogonal and parallel to said plane face, such that the edge of said dihedron is parallel to said plane face, such that the facet of said fourth benchmark element that is parallel to said plane face is coplanar with the corresponding facets of said three benchmark elements, and such that the edge of the dihedron of said fourth benchmark element is colinear with the colinear edges of said first and second benchmark elements.

It is then advantageous for said fourth benchmark element and said second benchmark element to be on opposite sides of the alignment formed by the first and third benchmark elements.

The said benchmark elements may be constituted by cylindrical studs whose end sections constitute the facets parallel to said plane face, with the two facets of said first benchmark element which are orthogonal to said plane face being radial while the facets of said second benchmark element and of the optional fourth benchmark element that are orthogonal to said plane face are diametral.

It can be seen that with the benchmark device of the present invention, it suffices to measure the distance of each of the coplanar facets of the three benchmark elements relative to a reference point or to a reference plane to obtain the orientation of the plane of said facets and thus the orientation of said plane face carrying said benchmark elements. In addition, by measuring the distances, relative to a system of fixed axes, of said two facets of said first element orthogonal to said plane face, and the distances of said facet of said second element (and optionally of said fourth element), likewise orthogonal to said plane face, the position of the device's system of reference axes can be obtained, and thus the position of said plane face relative to said system of fixed axes.

If the orientation and the position of said plane face is adjustable, it is thus possible to bring it into coincidence with a nominal reference position.

If said plane face is not adjustable in orientation and in position, its real orientation and position relative to said reference nominal position are nevertheless known, and can be taken into account.

Thus, an application of the device of the present invention comprises a system enabling a member to be brought to a precise location of an object linked to a plane face, said plane face occupying a fixed position which is different from but adjacent to a reference nominal position, the system being remarkable in that:
said member is carried by a moving support capable of moving in translation along three orthogonal axes and capable of rotating about two perpendicular axes;
said moving support carries a distance detector;

said system includes three benchmark elements which are carried by said plane face and which are such that:

the first benchmark element includes a rectangular trihedron with two facets that are orthogonal to said plane face and a third facet of said trihedron being parallel to said plane face such that one of the edges of said trihedron is perpendicular to said plane face and the other two edges of said trihedron are parallel to said plane face;

the second benchmark element includes a rectangular dihedron whose facets are respectively orthogonal and parallel to said plane face, such that the edge of said dihedron is parallel to said plane face, and the third benchmark element includes a facet parallel to said plane face; and said benchmark elements are disposed on said plane face in such a manner that:

they are not in alignment;

the facets of said three benchmark elements that are parallel to said plane face are coplanar; and said edge of said second benchmark element is colinear with one of the two edges of said first benchmark element that are parallel to said plane face.

In such an application, said object linked to said plane face may be a drilling template provided with a plurality of holes and intended to be fixed on a workpiece that is to be machined, and said member may be a drill bit, a reamer, or a similar tool, that is to be inserted in at least some of the holes in said drilling template. Said drilling template may be plane and may have a face that coincides with said plane face. It may alternatively be curved and be fixed relative to said plane face (which may be embodied physically or not) by means of said benchmark elements. Said drilling template is accurately positioned relative to said workpiece to be machined, but the workpiece itself need not occupy a position that is accurate to its own support, such that relative thereto the position and the orientation of said plane face are close to but different from the position and orientation of said nominal position. The system must thus adapt the orientation and the position of said member to enable it to be inserted successively into said holes of the template.

The said system preferably includes a computer controlling the displacement and the orientation of said moving support as a function of the measurements of said distance detector.

It is then advantageous for said moving support to be the "hand" of a robot.

Naturally, under such circumstances, the robot knows said nominal position and it determines the real orientation and position of said plane face on the basis of said nominal position. It is thus essential that when the robot brings the distance detector face to face with the nominal position of a stud, it does at least find a portion of said stud. In other words, the radius of said benchmark studs must be greater than the positioning tolerances in all directions of said plane face relative to a nominal position.

For simplification purposes, said distance detector delivers a signal when it finds itself at a predetermined distance from one of the facets of said benchmark elements.

BRIEF DESCRIPTION OF THE DRAWINGS

An embodiment of the invention is described by way of example with reference to the accompanying drawings, in which:

FIG. 1 is a face view of a plane face fitted with a benchmark device of the present invention, said view corresponding to arrow F1 in FIG. 2.

FIG. 2 is an elevation view of the plane face in FIG. 1.

FIG. 3 is an end view of the plane face of FIGS. 1 and 2 looking along arrow F3 of FIG. 2.

DETAILED DESCRIPTION

Figure 4:
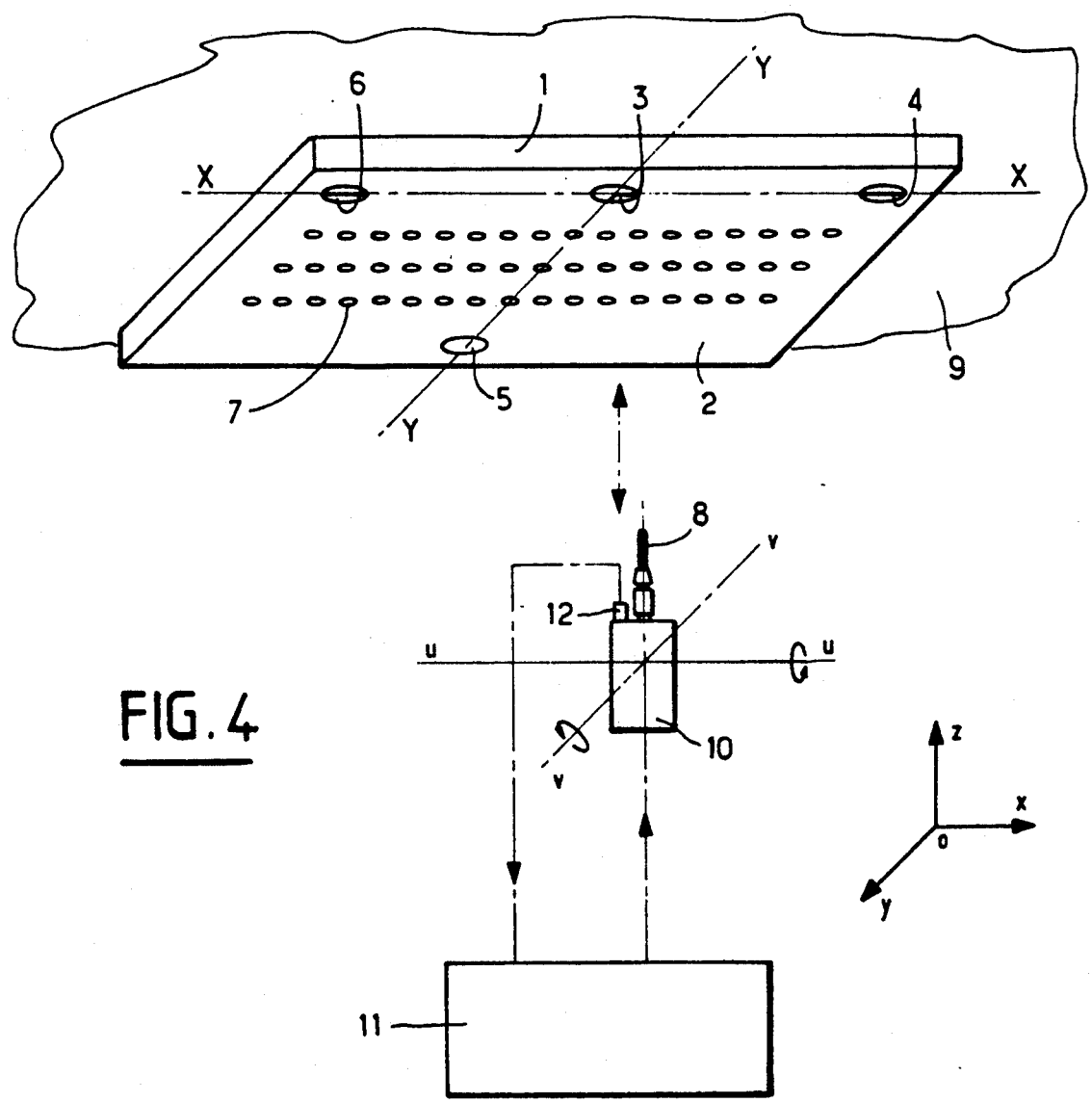
FIG. 4 shows an application of the device shown in FIGS. 1 to 3.
Figure 4B:
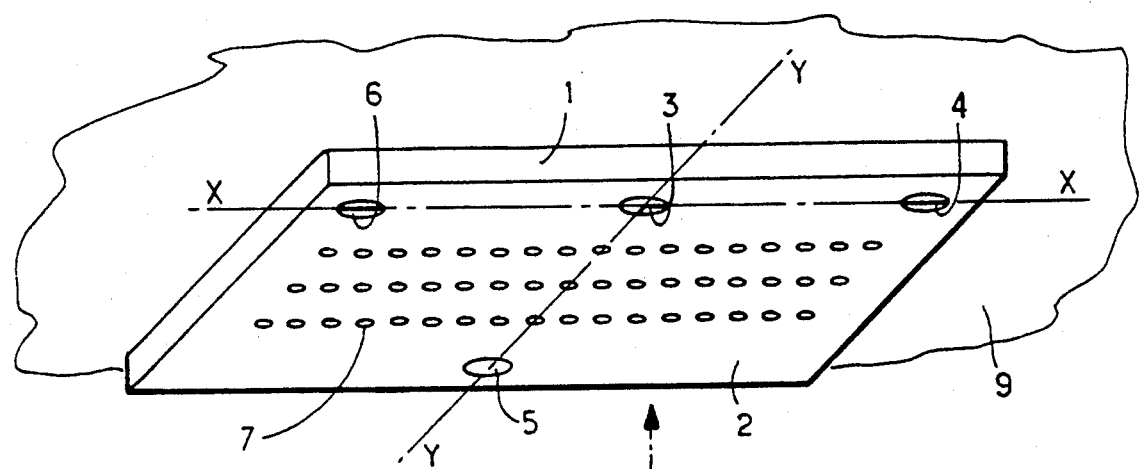
Figure 4A:
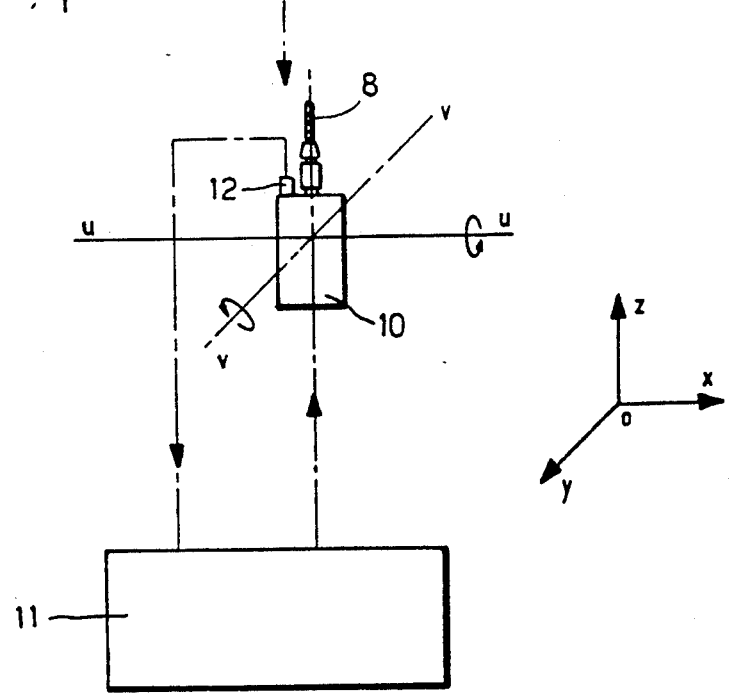

FIGS. 1 to 3 show a device 1, e.g. a drilling template (in which the guide holes are not shown) that is provided with a plane face 2.

The following are fixed on said plane face:

a first benchmark element 3 in the form of a one-fourth of a cylinder, comprising two axial facets 3.1 and 3.2 that are mutually orthogonal, and that are orthogonal to said plane face 2, together with an end face 3.3 that is orthogonal to said axial facets 3.1 and 3.2 and parallel to said plane face 2. The three facets 3.1, 3.2, and 3.3 form a rectangular trihedron defining three edges, two of which 3.4 and 3.5 are mutually perpendicular but parallel to the plane face 2, while the third edge 3.6 is perpendicular to said plane face 2;

a second benchmark element 4 which is semi-cylindrical in shape, having a diametral facet 4.1 orthogonal to the plane face 2, and an end facet 4.2 orthogonal to the diametral facet 4.1 and parallel to said plane face 2. The two facets 4.1 and 4.2 form a rectangular dihedron whose edge 4.3 is parallel to said plane face 2;

a third benchmark element 5 which is cylindrical in shape, having an end facet 5.1 parallel to the plane face 2; and a fourth benchmark element 6 which is semi-cylindrical in shape like the second benchmark element 4, comprising a diametral facet 6.1 orthogonal to the plane face 2 and an end facet 6.2 orthogonal to the diametral facet 6.1 and parallel to said plane face 2. The two facets 6.1 and 6.2 form a rectangular dihedron whose edge 6.3 is parallel to said plane face 2.

The end facets 3.3, 4.2, 5.1, and 6.2 of the elements 3, 4, 5, and 6 are coplanar, thereby defining a reference plane P. In addition, the edges 3.4, 4.3, and 6.3 of the elements 3, 4, and 6 are colinear, thereby defining an axis X—X, the elements 4 and 6 being disposed on opposite sides of the element 3. The element 5 is at least approximately disposed in line with the edge 3.5 of the element 3, with said edge 3.5 defining an axis Y—Y perpendicular to the axis X—X.

The benchmark elements 3 to 5 are disposed in the vicinity of the periphery of the plane face 2.

It can thus be seen that the benchmark elements 3 to 5 determine:

a reference plane P parallel to said plane face 2 and enabling the orientation thereof to be located; and a system of rectangular axes X—X, Y—Y having its origin situated at the intersection between the edges 3.4, 3.5, and 3.6 of the element 3 and which enables any point of said face 2 to be located.

FIG. 4 is a diagram showing an application of the device shown in FIGS. 1 to 3.

The device 1 is a drilling template, i.e. a plate pierced by a plurality of guide holes 7 for a drill bit or for a reamer 8. The drilling template 1 is fixed on a workpiece 9 in which holes are to be drilled corresponding to guide holes 7. For example, the workpiece 9 is the wing of an aircraft in the vicinity of its connection to the fuselage, with the holes to be drilled serving to receive fixing means for connecting said wing to said fuselage.

The tool 8 is mounted on the "hand" 10 of a robot (not shown) under the control of a computer 11. The "hand" 10 can be displaced in translation parallel to the three axes Ox, Oy, and Oz of a reference axis system, and it may be pivoted about two perpendicular axes u—u and v—v.

After being fixed on the workpiece 9, the drilling template 1 occupies an accurate position relative thereto. However, because of possible tolerance in the positioning of the workpiece 9 relative to its support (not shown), the position of the template 1 does not coincide in the robot's axis system Ox, Oy, and Oz with the nominal reference position that it ought to occupy.

Thus, in order to correct the resulting positioning and orientation errors of the guide holes 7 relative to the axis system Ox, Oy, and Oz, the above-described benchmark elements 3 to 6 are provided on the plane face 2 of said template 1. In addition, a distance measuring device 12, e.g. of the laser type is mounted on the "hand" 10. The distance measuring device 12 emits a signal when it is at a predetermined distance from an obstacle. Naturally, the positioning of the distance measuring device 12 relative to the axis of the tool 8 is fixed and known, thereby making it easy to deduce the position of the tool 8 once the position of the detector 12 is known.

Thus, with the drilling template 1 fixed on the workpiece 9, the robot "hand" 10 is displaced in translation parallel to the plane Ox,Oy until it comes over the position that ought to be occupied by one of the studs 3 to 6, e.g. the stud 3, assuming that the drilling template 1 is in its nominal reference position which is known to the robot. Given that the positioning tolerances of the drilling template 1 relative to said nominal reference position are such that the real position of said stud 3 overlaps the nominal position thereof, at least in part, the detector 12 always finds itself over said stud 3. The robot "hand" 10 is then displaced parallel to the axis Oz to move closer to said stud 3. When the detector 12 is at a predetermined distance from the face 3.3 of the stud 3, it sends a detection signal to the computer 11. The computer then knows the exact position of said face 3.3 relative to the plane Ox,Oy.

By performing similar operations with the other studs 4, 5, and 6, the computer 11 measures the distances between each of the faces 4.2, 5.1, and 6.2 and said plane Ox,Oy. It thus knows the orientation of the plane face 2 relative to the plane Ox,Oy, and it deduces therefrom the value of the angle or of the angles through which it needs to rotate the "hand" 10 about the axes u—u and v—v so as to bring the tool 8 perpendicular to said plane face 2.

Thereafter, the "hand" 10 is displaced successively parallel to the axis Oy to discover the distances between said faces 3.1, 4.1, and 6.1 and the plane Ox,Oz. The computer 11 then knows the position of the axis X—X in the reference axis system Ox, Oy, and Oz.

Similar distance measuring operations are then performed to determine the distance of the face 3.2 of stud 3 from the plane Oy,Oz and thus the position of the axis Y—Y in the reference axis system Ox, Oy, Oz.

Once the orientation of the face 2 and then the position of the axis system X—X, Y—Y have been located relative to the axis system Ox, Oy, and Oz, it will readily be understood that the computer 11 can insert the tool 8 into any of the holes 7 (defined by its coordinates relative to the axes X—X and Y—Y) in the plane face 2.

The studs 3 to 6 thus make it possible for the computer 11 to know the position and the orientation of each hole accurately by means of an axis transformation.

It may be observed that in FIGS. 1 to 4, the plane face 2 is physically embodied. However this need not be the case and it could be determined solely by the faces of the studs 3, 4, 5, and 6 opposite to the faces 3.3, 4.2, 5.1, and 6.2, with said studs being fixed to an object (not shown) by columns carrying said studs at their free ends. Naturally, the benchmark of said non-physically embodied plane face 2 can still be used to locate any point of said object which is fixed relative thereto.

I claim:

1. A benchmark device for a plane face, wherein the device includes three benchmark elements, which are carried by said plane face and which are such that:

the first benchmark element includes a rectangular trihedron with two facets that are orthogonal to said plane face and a third facet of said trihedron being parallel to said plane face such that one of the edges of said trihedron is perpendicular to said plane face and the other two edges of said trihedron are parallel to said plane face;

the second benchmark element includes a rectangular dihedron whose facets are respectively orthogonal and parallel to said plane face, such that the edge of said dihedron is parallel to said plane face, and the third benchmark element includes a facet parallel to said plane face; and wherein said benchmark elements are disposed on said plane face in such a manner that:

they are not in alignment;

the facets of said three benchmark elements that are parallel to said plane face are coplanar; and said edge of said second benchmark element is colinear with one of the two edges of said first benchmark element that are parallel to said plane face.

2. The device according to claim 1, wherein said third benchmark element is disposed in such a manner that the alignment it forms with said first benchmark element is at least substantially perpendicular to the direction defined by the colinear edges of said first and second benchmark elements.

3. The device according to claim 1, for use with a plane face that is elongate in the direction defined by said colinear edges of said first and second benchmark elements, the device being wherein it includes a fourth benchmark element including a rectangular dihedron whose facets are respectively orthogonal and parallel to said plane face such that the edge of said dihedron is parallel to said plane face, wherein the facet of said fourth benchmark element that is parallel to said plane face is coplanar with the corresponding facets of said three benchmark elements, and wherein the edge of the dihedron of said fourth benchmark element is colinear with the colinear edges of said first and second benchmark elements.

4. The device according to claim 3, wherein said fourth benchmark element and said second benchmark element lie on opposite sides of the alignment formed by the first and third benchmark elements.

5. The device according to claim 1, wherein said benchmark elements are constituted by cylindrical studs whose end sections constitute facets parallel to said plane face, the two facets of said first benchmark element that are orthogonal to said plane face being radial, whereas the facet of said second benchmark element and the facet of the optional fourth benchmark element that are orthogonal to said plane face, are diametral facets.

6. The device according to claim 5, for enabling the orientation and the position of said plane face to be determined relative to a nominal position, the device being wherein the radius of said cylindrical studs is greater in all directions than the positioning tolerances for said plane face relative to said nominal position.

7. A system enabling a member to be brought to a precise location of an object linked to a plane face, said plane face occupying a fixed position that is different from but adjacent to a nominal position, wherein:
   said member is carried by a moving support capable of moving in translation along three orthogonal axes and capable of rotating about two perpendicular axes, said movable support being movable with respect to said three orthogonal axes;
   said plane face being positioned with respect to said three orthogonal axes;
   said movable support accordingly being movable with said respect to said plane face;
   said moving support carries a distance detector;
   said system includes three benchmark elements which are carried by said plane face and which are such that:
      the first benchmark element includes a rectangular trihedron with two facets that are orthogonal to said plane face and a third facet of said trihedron being parallel to said plane face such that one of the edges of said trihedron is perpendicular to said plane face and the other two edges of said trihedron are parallel to said plane face;
      the second benchmark element includes a rectangular dihedron whose facets are respectively orthogonal and parallel to said plane face, such that the edge of said dihedron is parallel to said plane face, and
      the third benchmark element includes a facet parallel to said plane face; and
   said benchmark elements are disposed on said plane face in such a manner that;
   they are not in alignment;
   the facets of said three benchmark elements that are parallel to said plane face are coplanar; and
   said edge of said second benchmark element is collinear with one of the two edges of said first benchmark element that are parallel to said plane face.

8. The system according to claim 7, wherein said object connected to said plane surface is a drilling template provided with a plurality of holes and designed to be fixed on a workpiece to be machined, and wherein said member is a tool for insertion in at least some of the holes of said drilling template.

9. The system according to claim 7, including a computer controlling the displacement and the orientation of said moving support as a function of the measurements of said distance detector, said distance detector on said moving support measuring the distances from said facets of said benchmarks.

10. The system according to claim 7, wherein said distance detector delivers a signal when it is at a predetermined distance from a facet of any one of said benchmark elements.

11. The system according to claim 7, wherein said moving support is the "hand" of a robot.

* * * * *